(12) United States Patent
Han

(10) Patent No.: US 7,457,272 B2
(45) Date of Patent: Nov. 25, 2008

(54) METHOD OF MANAGING A MOBILITY PROFILE OF A MOBILE NODE UNDER AN INTERNET PROTOCOL VERSION 6(IPV6)-BASED LOCALIZED MOBILITY MANAGEMENT

(75) Inventor: Youn-hee Han, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 10/834,021

(22) Filed: Apr. 29, 2004

(65) Prior Publication Data

US 2004/0240392 A1 Dec. 2, 2004

(30) Foreign Application Priority Data

Apr. 29, 2003 (KR) .................... 10-2003-0027313

(51) Int. Cl.
*H04Q 7/24* (2006.01)
(52) U.S. Cl. .................... 370/338; 370/331; 455/432.1; 455/435.1
(58) Field of Classification Search ................ 370/331, 370/338, 400; 455/405, 432.1–432.3, 435.1–435.3, 455/436
See application file for complete search history.

(56) References Cited

U.S. PATENT DOCUMENTS

| | | | | |
|---|---|---|---|---|
| 5,623,535 | A * | 4/1997 | Leung et al. | ................. 455/444 |
| 6,188,905 | B1 * | 2/2001 | Rudrapatna et al. | ...... 455/452.2 |
| 6,487,605 | B1 * | 11/2002 | Leung | ......................... 370/331 |
| 2002/0009066 | A1 * | 1/2002 | Shimizu et al. | ............. 370/338 |
| 2002/0090945 | A1 * | 7/2002 | Sasada | ....................... 455/435 |
| 2002/0168980 | A1 | 11/2002 | Gwon et al. | |
| 2004/0141477 | A1 * | 7/2004 | Xu et al. | ...................... 370/328 |
| 2004/0203861 | A1 * | 10/2004 | Sahinoglu | ................ 455/456.1 |

OTHER PUBLICATIONS

Malinen et al., "Draft-Malinen-MobileIP-Regreg6-01.TXT: Mobile IPV6 Regional Registrations", Internet Drafts Archive, Mar. 2, 2001, pp. 1-28, X002288881.
Curran K: "Minimizing the Handoff Latency in Ad-Hoc Networks When Streaming Media to Mobile Device", International Journal of Wireless Information Networks, vol. 8, No. 3, Jul. 3, 2001, pp. 177-187, XP008033009.
Rudrapatna et al., "User Profile-Driven Resource Allocation for Cellular Networks" ICPWC 1997, pp. 178-183, XP002288882.

* cited by examiner

*Primary Examiner*—George Eng
*Assistant Examiner*—Abdias Mondesir
(74) *Attorney, Agent, or Firm*—Sughrue Mion, PLLC

(57) ABSTRACT

A method of managing a mobility profile of a mobile node that uses a local mobility agent for managing a local mobility domain. The method includes obtaining and recording local temporary addresses, connection link temporary addresses and binding update times of the respective mobile nodes in a cacheable memory of the local mobility agent, calculating stay times of the respective mobile nodes on the presently linked subnet using information recorded in the cacheable memory and recording the stay times of the respective mobile nodes in a storage device of the local mobility agent, calculating an average stay time of the respective mobile nodes on the presently linked subnet by accumulating the stay times recorded in the storage device and recording the average stay time in the storage device of the local mobility agent.

5 Claims, 4 Drawing Sheets

FIG. 6

|           | SUBNET(1) | SUBNET(2) | SUBNET(3) |     | SUBNET(N) |
|-----------|-----------|-----------|-----------|-----|-----------|
| SUBNET(1) | 0         | 0.34      | 0.06      | ... | 0.15      |
| SUBNET(2) | 0.02      | 0         | 0.66      | ... | 0.76      |
| SUBNET(3) | 0.39      | 0.27      | 0         | ... | 0.01      |
|           | ⋮         | ⋮         | ⋮         |     | ⋮         |
| SUBNET(N) | 0.16      | 0.09      | 0.08      | ... | 0         |

METHOD OF MANAGING A MOBILITY PROFILE OF A MOBILE NODE UNDER AN INTERNET PROTOCOL VERSION 6(IPV6)-BASED LOCALIZED MOBILITY MANAGEMENT

CROSS-REFERENCE TO RELATED APPLICATIONS

This application claims the benefit of Korean Patent Application No. 2003-27313 filed Apr. 29, 2003, in the Korean Intellectual Property Office, the disclosure of which is incorporated herein by reference.

BACKGROUND

1. Field of the Invention

The present invention relates to a method of managing a mobility profile of a mobile node under an IPv6 (Internet-Protocol version 6)-based localized mobility management, and more particularly, to a method of managing a mobility profile of a mobile node under IPv6-based localized mobility management which calculates and stores information to be included in the mobility profile of the mobile node, and manages a local mobility domain using the stored mobility profile.

2. Description of the Related Art

Recently, with the rapid spread of the Internet, the development of a wireless communication technology, and the performance improvement of mobile terminals such as a portable computer, PDA (Personal Digital Assistant), etc., wireless Internet users are increasing. Accordingly, diverse methods have been proposed in order to provide high-quality communication services with respect to a mobile node that is a mobile terminal moving its position at all times under a wireless Internet environment. Recently, IPv6 which is extended from IPv4 has been proposed, and a mobile IPv6 technology based on this proposal, has been developed.

According to the mobile IPv6 technology, the mobile node, even if it moves to an external network, communicates with a CN (corresponding node) using its own HA (home address) obtained from a home agent that is a router having registration information of the mobile node. For this, the mobile node is allocated with a CoA (Care of Address) that is a temporary address from an access router of the linked external network, and registers the allocated CoA in the home agent along with the HA, which is called a binding.

The mobile node should periodically update such a binding, which is called a binding update, in order to inform its position to the home agent. Also, if the mobile node moves to another network, the mobile node should perform the binding update and the confirming thereof in association with the home agent whenever it moves to another network, and this causes the load of the home network and the traffic on the Internet to increase. Especially, if the mobile node is far away from the corresponding node or the home network, this problem becomes severe, and it may take a long time, more than one second, for the binding update and the confirming thereof.

A LMM (Localized Mobility Management) technique has been proposed to solve the above-described problem. According to this LMM, even if the mobile node moves from one subnet to another subnet in a local mobility domain, the CoA of the mobile node in the local mobility domain is not changed, a new position of the mobile node is informed only to a local mobility agent, and packets coming to the mobile node are forwarded to the present position of the mobile node through the local mobility agent. Accordingly, a handoff can promptly occur since the binding update for the home network is reduced and the binding update for the local mobility agent is requested only in the local mobility domain. The CoA which is not changed in the local mobility domain and is not informed to an outside of the local mobility domain is called a RCoA (Regional CoA), and the CoA which is not informed to the outside of the local mobility domain and is registered in the local mobility agent is called a LCoA (on-Link CoA).

According to the localized mobility management technique, it is somewhat possible to solve the problem caused by the increase of the load of the home agent and the increase of the traffic on the Internet. However, since the binding update for the local mobility agent is required, the localized mobility management technique cannot completely overcome the problems such as a signaling delay and so on.

In the existing cellular mobile communications, a discriminative billing or service providing is performed using the mobility profile. Also, in the mobile IPv6 which is the basis of the next-generation mobile communications, it is expected to provide high-quality services by introducing the mobility profile to the mobility management technique. According to the present mobility management technique that adopts the mobile IPv6, and is related to an intellectual mobility management technique, extraction of statistical mobility patterns and position-based services of the mobile node has not been proposed.

In practice, most mobile nodes show a periodic mobility in accordance with time, day of the week, etc., and show a mobility pattern of a high-probability in the statistics. Accordingly, if it is possible to statistically extract the mobility pattern in the localized mobility domain of the mobile node and estimate the present position or mobility of the mobile node, the localized mobility management can be performed more efficiently, and the cost can be greatly reduced, so that a high-quality QoS can be provided to users.

However, as described above, since management information and a method of obtaining the management information, which are required for the detailed mobility profile management, have not yet been proposed, there has been a demand for the management information, and the methods of obtaining and maintaining the information.

SUMMARY

An object of the invention is to solve at least the above-identified problems and/or disadvantages and to provide at least the advantages described hereinafter.

Another object of the present invention is to provide a method of managing a mobility profile of a mobile node under an IPv6-based localized mobility management which calculates and stores information to be included in the mobility profile of the mobile node, and manages a local area network using the mobility profile.

Still another object of the present invention is to provide a method of managing a mobility profile of a mobile node using an LMA (Local Mobility Agent) for managing a local mobility domain that includes a plurality of subnets among which a plurality of mobile nodes move in a mobile communication environment.

To achieve the above objects and/or other features of the present invention, there is provided a method of managing a mobility profile of a mobile node using a local mobility agent for managing a local mobility domain that includes a plurality of subnets among which a plurality of mobile nodes move in a mobile communication environment, comprising the steps of obtaining and recording local temporary addresses, connection link temporary addresses and binding update times of the respective mobile nodes in a cacheable memory of the local mobility agent, calculating stay times of the respective mobile nodes on the presently linked subnet using information recorded in the cacheable memory and recording the stay times of the respective mobile nodes in a storage device of the local mobility agent, calculating average stay time of the respective mobile nodes on the presently linked subnet by accumulating the stay times recorded in the storage device and recording the average stay times in the storage device of the local mobility agent, and the local mobility agent managing the local mobility domain using the information recorded in the storage device.

Preferably, the stay time is calculated as a value obtained by subtracting the binding update time first sent by the mobile node when the mobile node is linked to the present subnet from the binding update time first sent by the mobile node when the mobile node moves to another subnet, and if the mobile node does not perform the binding update on the present subnet within a predetermined limited time, the stay time is calculated as a value obtained by subtracting the binding update time first sent by the mobile node when the mobile node is linked to the present subnet from the binding update time lastly sent by the mobile node on the present subnet.

It is preferable that the stay time is calculated as a value obtained by dividing a value obtained by accumulating the stay values of the mobile node calculated with respect to the present subnet by the total number of link times to the present subnet.

The method of managing a mobility profile of a mobile node further includes the steps of calculating an average stay time of all the mobile nodes on the respective subnet by accumulating the average stay times recorded in the storage device, and calculating an average stay time of all the mobile nodes on all the subnets by accumulating the average stay times of all the mobile nodes and recording the average stay time in the storage device of the local mobility agent.

It is preferable that the average stay time of all the mobile modes on the respective subnet is a value obtained by dividing a sum of the average stay times of the respective mobile nodes on the respective subnet by a sum of the number of all the mobile nodes.

It is preferable that the average stay time of all the mobile modes on all the subnets is a value obtained by dividing a sum of the average stay times of all the mobile nodes on the respective subnets by a sum of the number of all the subnets.

In another aspect of the present invention, there is provided a method of managing a mobility profile of a mobile node using a local mobility agent for managing a local mobility domain that includes a plurality of subnets among which a plurality of mobile nodes move in a mobile communication environment, comprising the steps of obtaining and recording local temporary addresses, connection link temporary addresses and binding update times of the respective mobile nodes in a cacheable memory of the local mobility agent, calculating moving vectors that indicate paths and times for which the respective mobile node moves from a certain subnet (i) to another subnet (j) using information recorded in the cacheable memory and recording the moving vectors of the respective mobile node in a storage device of the local mobility agent, and managing a local mobility domain using the information recorded in the storage device of the local mobility agent.

The moving vector is represented by (i, j, t), where i denotes the subnet (i), j denotes the subnet (j), and t denotes a binding update time first sent by the mobile node when the mobile node is linked to the subnet (j).

It is preferable that the method of managing a mobility profile of a mobile node further includes the step of calculating a subnet moving matrix having a moving rate, which indicates a probability that the respective mobile node moves from a certain subnet (k) to another subnet (l), as its (k, l)-th element, with respect to different natural numbers k and l which are smaller than or identical to a total number of subnets, and recording the subnet moving matrix in the storage device of the local mobility agent.

It is preferable that the (k, l)-th element of the subnet moving matrix is calculated as a value obtained by dividing a sum of the number of moving vectors from the subnet (k) to the subnet (l) by a sum of the number of all accumulated moving vectors of the mobile node.

It is preferable that the method of managing a mobility profile of a mobile node further includes the step of calculating an average subnet moving matrix for all the mobile nodes by accumulating the subnet moving matrices recorded in the storage device, and recording the average subnet moving matrix in the storage device of the local mobility agent.

It is preferable that a (k, l)-th element of the average subnet moving matrix is calculated as a value obtained by dividing a sum of the (k, l)-th elements of the subnet moving matrices of all the mobile nodes recorded in the storage device by a sum of the number of all the subnet moving matrices.

BRIEF DESCRIPTION OF THE DRAWINGS

The above objects and other advantages of the present invention will become more apparent by describing in detail a preferred embodiment thereof with reference to the attached drawings in which:

FIG. 6 is a view illustrating an example of a moving matrix according to the present invention.

DETAILED DESCRIPTION OF THE PREFERRED EMBODIMENTS

Figure 1:
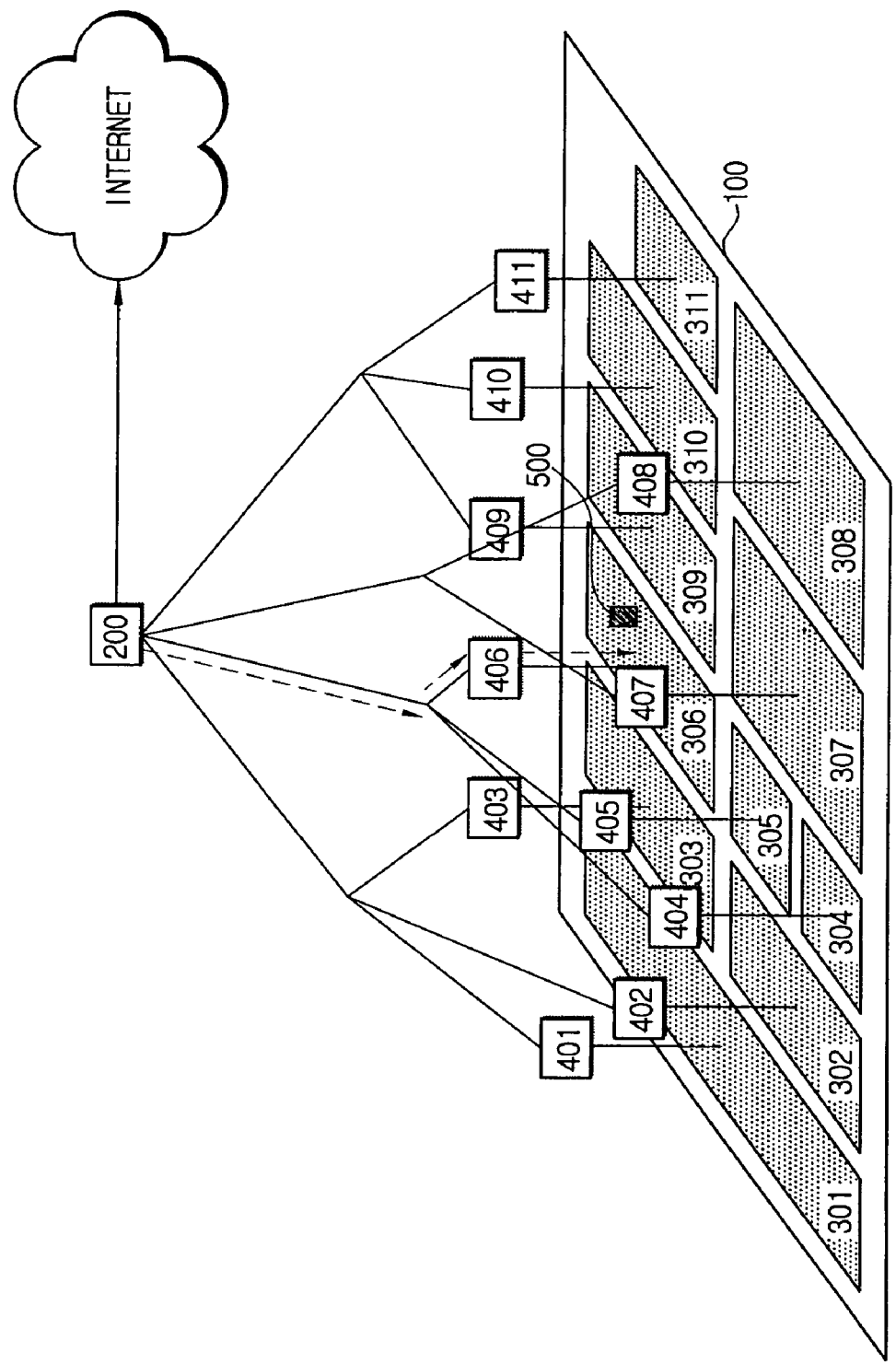
FIG. 1 is a view illustrating an example of a local mobility domain having a plurality of subnets.

Now, a method of managing a mobility profile of a mobile node according to the present invention will be described in detail with reference to the appended drawings in which like reference numerals refer to like elements.

FIG. 1 is a view illustrating an example of a local mobility domain having a plurality of subnets. Referring to FIG. 1, one local mobility domain 100 is composed of a plurality of subnets 301 to 311. The local mobility domain 100 has a local mobility agent 200, and the subnets 301 to 311 have routers 401 to 411, respectively. Also, the local mobility domain 100 is connected to the Internet, and a mobile node 500 is linked to the present subnet 306.

Figure 2:
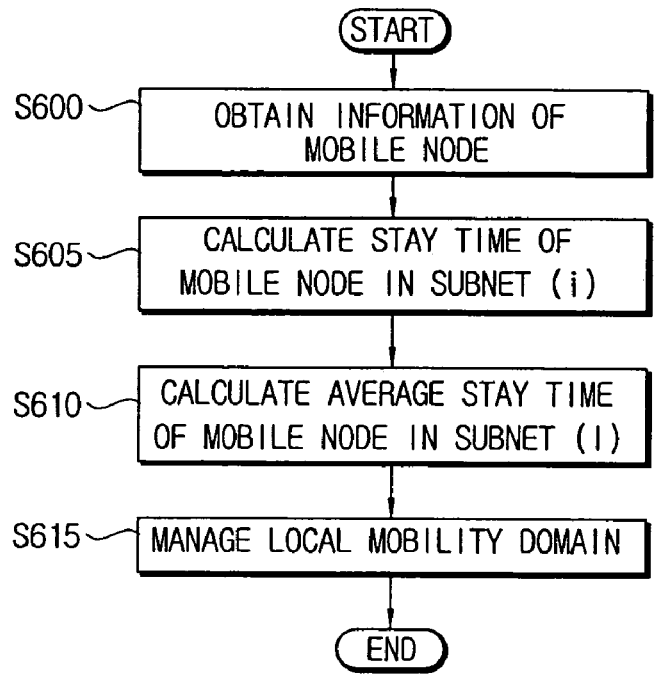
FIG. 2 is a flowchart illustrating a process of calculating and managing mobility profile information of a mobile node according to the present invention.

FIG. 2 is a flowchart illustrating a process of calculating and managing mobility profile information of a mobile node according to the present invention.

The local mobility agent 200 lists an RCoA, LCoA, life cycle, binding update time, information on a recent use of the corresponding list, etc., and stores the list in a binding cache, i.e., in its own memory, to manage the information list (step S600). This information list is updated whenever the local mobility agent 200 receives an initial binding update, which is sent by the mobile node 500 when the mobile node moves to a new subnet, and also when a following binding update, which is periodically sent in the same subnet, is received. Meanwhile, if the mobile node 500 escapes from the local mobility domain 100, the corresponding list stored in the memory is deleted.

Also, the local mobility agent 200 calculates a stay time (S_time(i, k, t)) of the respective mobile node 500 in the respective subnet (i), an average stay time AS_time(i), a moving vector (<i, j, t>) from a certain subnet (i) to another subnet (j), and a moving matrix (SM), and stores them in its own or a separate storage device as a database. This information is updated when the mobile node 500 moves through a subnet in the local mobility domain 100, and is also updated when the mobile node escapes from the local mobility domain 100 without being deleted.

The stay time (S_time(i, k, t)) of the mobile node 500 in a certain subnet (i) is calculated using an initial binding update time (i_time) sent by the mobile node when the mobile node is linked to the corresponding subnet (i). Also, the stay time is calculated using an initial binding update time (j_time) sent by the mobile node when the mobile node moves from the corresponding subnet (i) to another subnet (j). From the difference between the two time points, the subnet stay time (S_time(i, k, t)) is calculated (step S605). The subnet stay time (S_time(i, k, t)) calculated as above is stored along with the ID(i) of the corresponding subnet, the number (k) of times that the mobile node 500 visits the corresponding subnet, and the time (t=i_time) that the mobile mode 500 is linked to the corresponding subnet (i). The subnet stay time (S_time(i, k, t)) is expressed by the following equation.

$$S\_time(i, k, t) = j\_time - i\_time \quad [\text{Equation 1}]$$

However, if the time limit for the binding update elapses while the mobile node 500 does not send the following binding update, the above-described method cannot be used. For example, this happens when the power supply to the mobile node 500 is turned off, and it can be recognized that the link to the corresponding subnet (i) is disconnected after the time limit. Accordingly, in this case, the subnet stay time (S_time (i, k, t)) is calculated by the difference between the time (i2_time) when the mobile node 500 last sends the following binding update at the corresponding subnet (i) and the time (i_time) when the mobile node sends the initial binding update.

The average stay time (AS_time(i)) of the mobile node 500 in the subnet (i) is calculated as an average value of the respective stay times (S_time (i, k, t)) of the mobile node 500 in the subnet (i), and updated whenever the mobile node 500 moves from the subnet (i) to another subnet (step S610). The average stay time (AS_time(i)) of the mobile node 500 in the subnet (i) can be expressed by the following equation.

$$AS\_time(i) = \sum_{k} S\_time(i, k, t) / K \quad [\text{Equation 2}]$$

Here, k denotes the number of times that the mobile node visits the subnet (i), and K denotes the total number of times that the mobile node visits the subnet (i).

Figure 3:
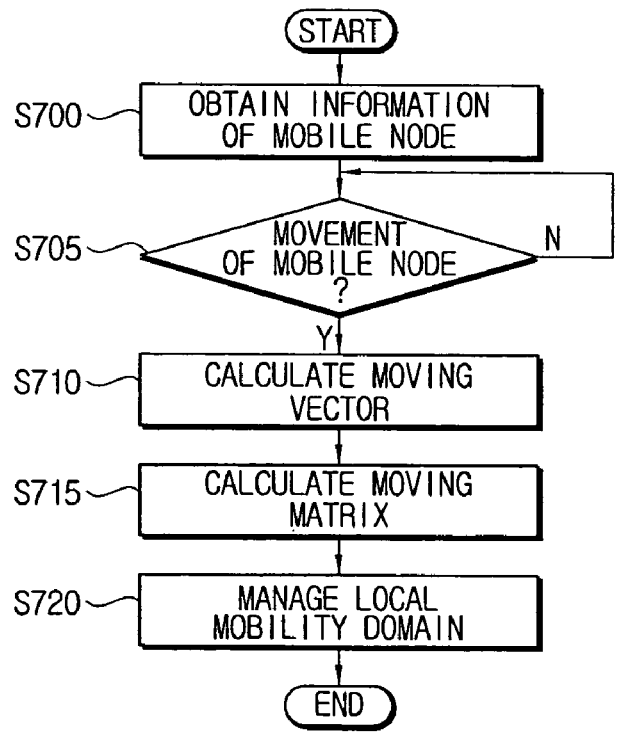
FIG. 3 is a flowchart illustrating a process of calculating and managing other mobility profile information of a mobile node according to the present invention.

FIG. 3 is a flowchart illustrating a process of calculating and managing other mobility profile information of a mobile node according to the present invention.

Whenever the mobile node 500 moves from a certain subnet (i) to another subnet (j) ("Y" at step S705), a moving vector (<i, j, t>) is calculated (step S710). Here, "i" and "j" denotes different subnets, and are natural numbers which are smaller than or equal to the total number "N" of subnets. The moving vector (<i, j, t>) indicates that the mobile node 500 moved from the subnet (i) to the subnet (j) at a time (t). The time (t) is the initial binding update time (j_time) sent by the mobile node 500 when the mobile node is linked to the subnet (j). With reference to the moving vectors <i, j, t1>, <j, k, t2> and <k, l, t3> arranged in the order of their time, the subnet to which the mobile node 500 moved, the order of movement, and the moving time can be known. The mobile node 500 moved from the subnet (i) to the subnet (j) at the time (T1), moved from the subnet (j) to the subnet (k) at the time (T2), and moved from the subnet (k) to the subnet (l) at the time (T3). Here, if the times (t1, t2, and t3) are in an ascending series, the mobile node moves in the order of the subnet (i), subnet (j), subnet (k) and subnet (l).

Using the moving vector of the mobile node, the moving matrix is calculated (step S715). The moving matrix SM of the mobile node 500 represents the probability that the mobile node 500 moves from a certain subnet to another subnet. If the number of subnets in the local mobility domain managed by the local mobility agent 200 is "N", the moving matrix SM becomes an "N×N" matrix having "N" rows and "N" columns. The (i, j)-th element of the moving matrix SM represents the moving rate (P<i, j>) of the mobile node 500 from the subnet (i) to the subnet (j).

The moving rate (P<i, j>) of the mobile node 500 from the subnet (i) to the subnet (j) is calculated using all of the moving vectors (<i, j, t>) accumulated until the stored information is updated. That is, the moving rate (P<i, j>) is calculated by dividing the number of moving vectors (<i, j, t>) corresponding to the movement of the mobile node 500 from the subnet (i) to the subnet (j) by the number of all of the moving vectors of the mobile node 500. For example, if the accumulated moving vectors according to the recent update are <i, j, t1>, <j, i, t2>, <j, k, t3>, <k, l, t4>, <l, k, t5>, <k, j, t6>, <j, i, t7>, <i, j, t8>, <j, k, t9>, and <k, j, t10>, the moving rate (P<i, j>) becomes "2/10=0.2" which is obtained by dividing the number "2" of moving vectors (<i, j, t>) by all of the moving vectors "10".

FIG. 6 is a view illustrating an example of the moving matrix SM of the mobile node 500 according to the present invention. Referring to FIG. 6, the moving rate (P<3, 2>) becomes "0.27" which is the (3,2)-th element of the moving matrix SM.

The stay time (S_time(i, k, t)) of the respective mobile node 500 in the respective subnet (i) is calculated as shown above, the average stay time (AS_time(i)), the moving vector (<i, j, t>) from a certain subnet (i) to another subnet (j), and the moving matrix SM are stored as profile information of the respective mobile node 500, and used for the local mobility agent 200 to manage the mobility profile of the local mobility domain 100 (steps S615 and S720).

Hereinafter, a method of calculating and managing the profile information commonly managed with respect to a plurality of mobile nodes.

Figure 4:
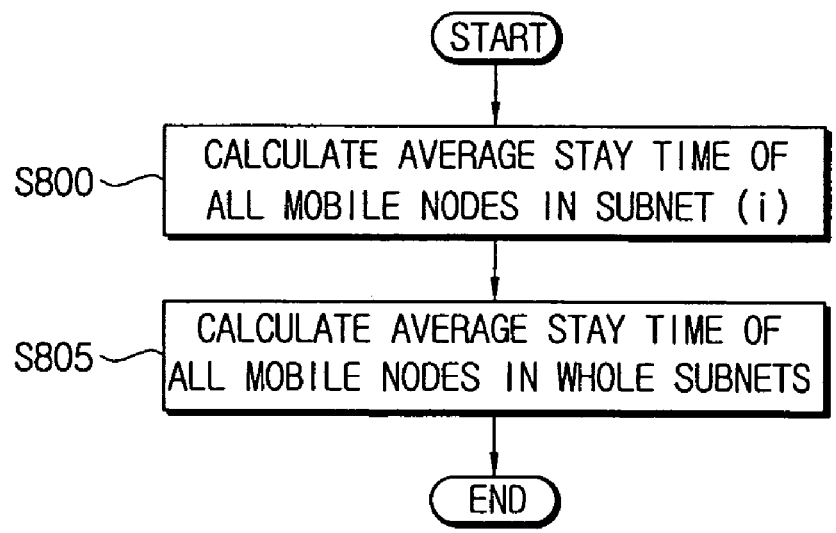
FIG. 4 is a flowchart illustrating a process of calculating and managing mobility profile information common to a plurality of mobile nodes according to the present invention.

FIG. 4 is a flowchart illustrating a process of calculating and managing mobility profile information common to a plurality of mobile nodes according to the present invention. The local mobility agent 200 calculates the average stay time (S_avg_time(i)) of all the mobile nodes in the respective subnet (i), the average stay time (S_total_avg_time) in all the subnets, and the average moving matrix (SM_avg), and stores them in its own or a separate storage device. This information is maintained without being deleted even when the mobile node escapes from the local mobility domain 100.

With respect to a certain subnet (i) in the local mobility domain 100, the average stay time (S_avg_time(i)) of all the mobile nodes in the subnet (i), which exist in the local mobility domain 100, is calculated (step S800). It is assumed that a set of all mobile nodes existing in the local mobility domain 100 is "U". The average stay time (S_avg_time(i)) of all the mobile nodes can be calculated by the following equation using the average stay time (AS_time(i)) of the respective mobile nodes.

$$S\_avg\_time(i) = \sum_{m \in U} AS\_time(i) \text{ of } m/N(U) \qquad [\text{Equation 3}]$$

Here, "m" denotes a respective mobile node in the local mobility domain 100, and "N(U)" denotes the number of elements of a set "U", i.e., the whole number of mobile nodes existing in the local mobility domain 100. Thus, the average stay time (S_avg_time(i)) of all the mobile nodes is calculated as an average value obtained by dividing the sum of the average stay time (AS_time(i)) of the respective mobile nodes by the number of all mobile nodes.

Then, the average stay time (S_total_avg_time) of all the mobile nodes in the whole subnets, which exist in the local mobility domain 100, is calculated using the average stay time (S_avg_time(i)) of all the mobile nodes in the respective subnet (i), which was calculated at the previous step (step S805). It is assumed that a set of all subnets existing in the local mobility domain 100 is "SU". The average stay time (S_total_avg_time(i)) of all the mobile nodes in the whole subnets can be calculated by the following equation.

$$S\_total\_avg\_time = \sum_{j} S\_avg\_time(i)/N(SU) \qquad [\text{Equation 4}]$$

Here, "N(SU)" denotes the number of elements of a set "SU", i.e., the whole number of subnets existing in the local mobility domain 100. That is, the average stay time (S_total_avg_time) of all the mobile nodes in the whole subnets is calculated as a value obtained by dividing the sum of the average stay time (S_avg_time(i)) of all the mobile nodes in the respective subnet (i) by the whole number of subnets.

Figure 5:
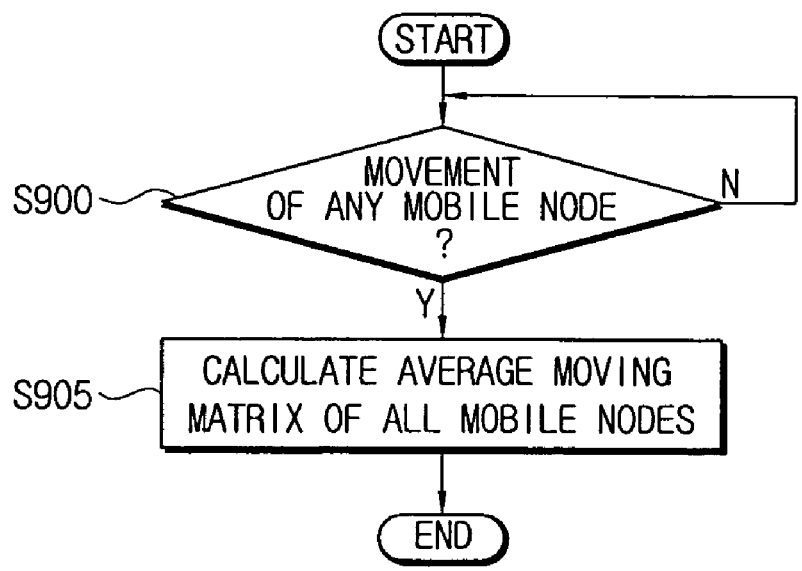
FIG. 5 is a flowchart illustrating a process of calculating and managing other mobility profile information common to a plurality of mobile nodes according to the present invention.

FIG. 5 is a flowchart illustrating a process of calculating and managing other mobility profile information common to a plurality of mobile nodes according to the present invention. Referring to FIG. 5, a method of calculating the average moving matrix (SM_avg) of all the mobile nodes existing in the local mobility domain will be explained.

Whenever a certain mobile node in the local mobility domain 100 moves ("Y" at step S900), or whenever a predetermined time elapses, the average moving matrix (SM_avg) of all the mobile nodes is calculated using the moving matrix calculated for the respective mobile node (step S905). As described above, if the number of subnets in the local mobility domain 100 is "N", the moving matrix SM becomes an "N×N" matrix having "N" rows and "N" columns. The (i, j)-th element of the moving matrix SM represents the moving rate (P<i, j>) of the mobile node 500 from the subnet (i) to the subnet The average moving matrix SM_avg of all the mobile nodes is the "N×N" matrix having the same number of rows and columns as the respective moving matrix SM. The (i, j)-th element (P_avg<i, j>) of the average moving matrix (SM_avg) of all the mobile nodes can be calculated by the following equation using the (i, j)-th element (P<i, j>) of the moving matrix SM of the respective mobile node.

$$P\_avg(i, j) = \sum_{m \in U} \langle i, j \rangle \text{ of } m/N(U) \qquad [\text{Equation 5}]$$

Here, "m" denotes a respective mobile node, "U" a set of all mobile nodes, and "N(U)" the whole number of mobile nodes. Thus, the (i, j)-th element (P_avg<i, j>) of the average moving matrix (SM_avg) is calculated as a value obtained by dividing the sum of the (i, j)-th elements (P<i, j>) of the moving matrix SM of the mobile nodes by the whole number of mobile nodes.

The local mobility agent 200 stores the average stay time (S_avg_time(i)) of all the mobile nodes in the respective subnet (i), the average stay time (S_total_avg_time) in all the subnets, and the average moving matrix (SM_avg) from a certain subnet (i) to another subnet (j) as the profile information common to a plurality of mobile nodes, and uses the profile information to manage the mobility profile of the local mobility domain 100. The profile information common to all the mobile nodes may be profiled and managed separately or along with the profile information common to the respective mobile node.

As described above, according to the present invention, the local mobility domain can be managed more efficiently by obtaining the mobility information of the respective mobile node in the local mobility domain, calculating a mobility profile using the obtained mobility information, and maintaining and updating the calculated mobility profile.

Also, the present invention makes it possible to develop an intelligent mobility management technique for the local mobility domain, and provides a method of managing a mobility profile of a mobile node for position-based services by extracting a statistical mobility pattern of the mobile node.

While the present invention has been described in detail, it should be understood that various changes, substitutions and alterations can be made hereto without departing from the spirit and scope of the invention as defined by the appended claims.

What is claimed is:

1. A method of managing a mobility profile of a mobile node using a local mobility agent for managing a local mobility domain that includes a plurality of subnets among which a plurality of mobile nodes move in a mobile communication environment, said method comprising:

obtaining and recording local temporary addresses, connection link temporary addresses and binding update times of the respective plurality of mobile nodes in a cacheable memory of the local mobility agent;

calculating stay times of the respective plurality of mobile nodes on a presently linked subnet using first information recorded in the cacheable memory and recording the stay times of the respective mobile nodes in a storage device of the local mobility agent;

calculating a first average stay time of the respective plurality of mobile nodes on the presently linked subnet by accumulating the stay times recorded in the storage device and recording the calculated first average stay times in the storage device of the local mobility agent; and the local mobility agent managing the local mobility domain using second information recorded in the storage device, wherein a respective one of the stay times is calculated as a value obtained by subtracting a first binding update time first sent by the mobile node when the mobile node is linked to the presently linked subnet from a second binding update time first sent by the mobile node when the mobile node moves to another subnet, and if the mobile node does not perform the binding update on the presently linked subnet within a predetermined time limit, said respective one of the stay times is calculated as a value obtained by subtracting the first binding update time first sent by the mobile node when the mobile node is linked to the presently linked subnet from a third binding update time last sent by the mobile node on the presently linked subnet.

2. A method of managing a mobility profile of a mobile node using a local mobility agent for managing a local mobility domain that includes a plurality of subnets among which a plurality of mobile nodes move in a mobile communication environment, said method comprising:

obtaining and recording local temporary addresses, connection link temporary addresses and binding update times of the respective plurality of mobile nodes in a cacheable memory of the local mobility agent;

calculating stay times of the respective plurality of mobile nodes on a presently linked subnet using first information recorded in the cacheable memory and recording the stay times of the respective mobile nodes in a storage device of the local mobility agent;

calculating a first average stay time of the respective plurality of mobile nodes on the presently linked subnet by accumulating the stay times recorded in the storage device and recording the calculated first average stay times in the storage device of the local mobility agent; and the local mobility agent managing the local mobility domain using second information recorded in the storage device, wherein the first average stay time is calculated as a value obtained by dividing a value obtained by accumulating the respective ones of the stay times of one of said respective plurality of mobile nodes, calculated with respect to the presently linked subnet by a total number of link times to the presently linked subnet.

3. A method of managing a mobility profile of a mobile node using a local mobility agent for managing a local mobility domain that includes a plurality of subnets among which a plurality of mobile nodes move in a mobile communication environment, said method comprising:

obtaining and recording local temporary addresses, connection link temporary addresses and binding update times of the respective plurality of mobile nodes in a cacheable memory of the local mobility agent;

calculating stay times of the respective plurality of mobile nodes on a presently linked subnet using first information recorded in the cacheable memory and recording the stay times of the respective mobile nodes in a storage device of the local mobility agent;

calculating a first average stay time of the respective plurality of mobile nodes on the presently linked subnet by accumulating the stay times recorded in the storage device and recording the calculated first average stay times in the storage device of the local mobility agent; and the local mobility agent managing the local mobility domain using second information recorded in the storage device, said method further comprising:

calculating a second average stay time of all the mobile nodes on the respective subnet by accumulating the first calculated average stay times recorded in the storage device; and calculating a third average stay time of all of the plurality of mobile nodes on all of the plurality of subnets by accumulating the first calculated average stay times of all of the plurality of mobile nodes and recording the third average stay time in the storage device of the local mobility agent.

4. The method as claimed in claim 3, wherein the second average stay time of all of the mobile modes on the respective subnet is a value obtained by dividing a sum of the calculated first average stay times of the respective plurality of mobile nodes on the respective subnet by a sum of the number of all of the plurality of mobile nodes.

5. The method as claimed in claim 3, wherein the third average stay time of all of the mobile modes on all the plurality of subnets is a value obtained by dividing a sum of said calculated first average stay times of all of the plurality of mobile nodes on the respective subnets by a sum of a number of all the subnets.

* * * * *